United States Patent [19]
Ichinohe et al.

[11] Patent Number: 5,703,159
[45] Date of Patent: Dec. 30, 1997

[54] MODIFICATION OF RESINS WITH ISOCYANATOSILOXANES

[75] Inventors: Shoji Ichinohe; Toshio Yamazaki; Akira Yamamoto, all of Usui-gun, Japan

[73] Assignee: Shin-Etsu Chemical Co., Ltd., Tokyo, Japan

[21] Appl. No.: 570,387

[22] Filed: Dec. 11, 1995

[30] Foreign Application Priority Data

Dec. 12, 1994 [JP] Japan .................................. 6-332149
Jul. 17, 1995 [JP] Japan .................................. 7-202815

[51] Int. Cl.$^6$ .................................................. C08G 77/26
[52] U.S. Cl. ...................... 525/54.3; 525/464; 525/458; 525/457; 525/476; 525/446; 525/440; 525/58; 525/102; 525/399; 556/414
[58] Field of Search .......................... 525/399, 102, 525/58, 440, 446, 476, 457, 458, 464, 54.3; 556/414

[56] References Cited

U.S. PATENT DOCUMENTS

| | | | |
|---|---|---|---|
| 3,332,900 | 7/1967 | Reischl et al. | 525/58 |
| 4,345,053 | 8/1982 | Rizk et al. | 525/440 |
| 4,822,850 | 4/1989 | Yashuda et al. | 528/28 |
| 4,981,988 | 1/1991 | Ichinohe et al. | 556/425 |
| 5,045,599 | 9/1991 | Murase | 525/101 |
| 5,250,614 | 10/1993 | Ono et al. | 525/58 |
| 5,384,365 | 1/1995 | Hanada et al. | 525/105 |
| 5,412,132 | 5/1995 | Lucarelli et al. | 556/414 |
| 5,583,244 | 12/1996 | Uchida et al. | 556/419 |

FOREIGN PATENT DOCUMENTS

| | | | |
|---|---|---|---|
| 0 274 103 A3 | 7/1988 | European Pat. Off. | C08G 77/38 |
| 0 605 962 A2 | 7/1994 | European Pat. Off. | C08G 77/26 |
| 605 962 | 7/1994 | European Pat. Off. | |
| 6-116390 | 4/1994 | Japan . | |

OTHER PUBLICATIONS

J. Polymer Sc. 29(1991) Jul. No. 8 pp. 1097–1105, "Hydrosilylation of m–TMI . . . ", Zhou & Smid.

Primary Examiner—Margaret W. Glass
Attorney, Agent, or Firm—Millen, White, Zelano, & Branigan, P.C.

[57] ABSTRACT

Resins having a group reactive with an isocyanate group on a side chain are modified with isocyanatosiloxanes. In one form, the isocyanatosiloxane is a single end isocyanatosiloxane obtained by effecting addition reaction between a single end hydrogenosiloxane and an isocyanate group-containing organic silicon compound having one isocyanate group and at least one aliphatic unsaturated hydrocarbon group. A single end isocyanatosiloxane obtained by introducing an isocyanate group into a single end primary aminosiloxane is also useful. In another form, the isocyanatosiloxane is a polyfunctional isocyanatosiloxane which is obtained by effecting addition reaction between a hydrogenosiloxane having at least two SiH groups and an isocyanate group-containing organic silicon compound having one isocyanate group and one aliphatic unsaturated hydrocarbon group.

21 Claims, No Drawings

MODIFICATION OF RESINS WITH ISOCYANATOSILOXANES

BACKGROUND OF THE INVENTION

1. Field of the Invention

This invention relates to a method for modifying resins with isocyanatosiloxanes in an industrially advantageous manner without problems of resin gelation and off-setting.

2. Prior Art

With respect to the modification of resins with single end isocyanatosiloxanes, Japanese Patent Publication (JP-B) No. 41693/1992 discloses a method for modifying a resin with a single end isocyanatosiloxane which is derived by reacting a single end carbinol-terminated siloxane with hexamethylene diisocyanate (abbreviated as HDI). It is understood that HDI is an exemplary diisocyanate while other examples of the diisocyanate which can be used herein include tolylene diisocyanate, isophorone diisocyanate, and methylene bis (phenylisocyanate).

Some problems arise with this method. Since synthesis of isocyanatosiloxane uses HDI in excess, some HDI is left as an impurity. Where modified resins are synthesized using resins having many isocyanate-reactive functional groups on side chains, the resins can be gelled with the impurity. A siloxane compound having carbinol siloxane added to both the two isocyanate groups of HDI and not reactive with resins is produced as a by-product unless HDI is used in large excess. If a modified resin is synthesized using such a reaction product, a sheet of the modified resin in roll form gives rise to the off-setting problem that unreacted silicone eventually migrates to the opposed surface.

With respect to the modification of resins with siloxanes having an isocyanate group at each end, it is known to obtain double end isocyanatosiloxanes by reacting double end carbinol-terminated siloxanes with difunctional isocyanates such as tolylene diisocyanate, methylene bis (phenylisocyanate), hexamethylene diisocyanate, and isophorone diisocyanate. This method, however, requires use of 2 moles or more of the difunctional isocyanate per mole of the double end carbinol-terminated siloxane, and the residual difunctional isocyanate raises a problem.

More particularly, since the difunctional isocyanate is used in excess, it is left in the reaction product as an impurity. Where modified resins are synthesized using resins having many isocyanate-reactive functional groups on side chains, the resins can be gelled with the impurity. A siloxane compound having carbinol siloxane added to both the two isocyanate groups of the difunctional isocyanate and not reactive with resins is produced as a by-product unless the difunctional isocyanate is used in large excess. If a modified resin is synthesized using such a reaction product, a sheet of the modified resin in roll form gives rise to the off-setting problem that unreacted silicone eventually migrates to the opposed surface.

It is noted that no satisfactory synthesis processes are available for siloxanes further having an isocyanate group on a side chain, that is, having three or more isocyanate groups in a molecule.

It is, therefore, desired to have a method for modifying resins with isocyanatosiloxanes without the above-mentioned problems.

SUMMARY OF THE INVENTION

An object of the present invention is to provide a method for modifying resins with isocyanatosiloxanes in an industrially advantageous manner without problems of resin gelation and off-setting, the resulting modified resins having improved slippage on their surface.

Briefly stated, the present invention provides a method for modifying a resin having a group reactive with an isocyanate group on a side chain with a single end isocyanatosiloxane. In a first aspect, the isocyanatosiloxane is obtained by effecting addition reaction between a single end hydrogenosiloxane of the general formula (I) and an isocyanate group-containing organic silicon compound having one isocyanate group and at least one aliphatic unsaturated hydrocarbon group in a molecule of the general formula (II).

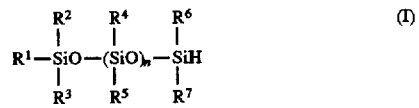

Each of $R^1$ to $R^7$, which may be identical or different, is a substituted or unsubstituted monovalent hydrocarbon group having 1 to 8 carbon atoms and letter n is an integer of at least 1.

Each of $R^8$ to $R^{12}$, which may be identical or different, is a substituted or unsubstituted monovalent hydrocarbon group having 1 to 8 carbon atoms or $R^8$ to $R^{12}$, taken together, may form a cyclic structure, with the proviso that at least one of $R^8$ to $R^{12}$ is an aliphatic unsaturated hydrocarbon group; $R^{13}$ is a divalent hydrocarbon group having 1 to 12 carbon atoms; and letter m is an integer inclusive of 0.

In a second aspect, the isocyanatosiloxane is a single end isocyanatosiloxane of the general formula (III) which is obtained by introducing an isocyanate group into a single end primary aminosiloxane of the general formula (IV).

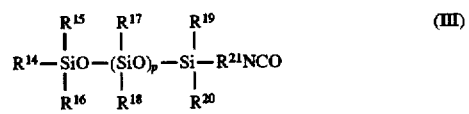

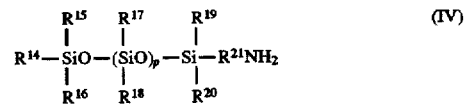

Each of $R^{14}$ to $R^{20}$, which may be identical or different, is a substituted or unsubstituted monovalent hydrocarbon group having 1 to 8 carbon atoms; $R^{21}$ is a divalent hydrocarbon group having 1 to 12 carbon atoms; and letter p is an integer of at least 1.

We proposed in Japanese Patent Application Kokai (JP-A) No. 256661/1994 the synthesis of a single end isocyanatosiloxane using m-isopropenyl-α,α-dimethylbenzylisocyanate (m-TMI). Addition reaction occurs between hydrogenosiloxane and m-TMI to a greatly varying extent. With poorer reactivity, the reaction requires more than 50 hours until completion. As compared with the use of m-TMI, the synthesis of a single end isocyanatosiloxane according to the present invention offers many advantages that the time required for addition reaction is short, that is, addition reaction is complete within 10 hours, the reaction product contains less amounts of impurities which are undesirable for synthesis of modified resins (e.g., diisocyanates and isocyanate-free siloxanes), those siloxanes which are unreactive with resins are not produced, and hence an improved single end isocyanatosiloxane is obtained.

Therefore, the method for modifying a resin with the single end isocyanatosiloxane according to the invention can produce a modified resin having improved surface slippage in an industrially advantageous manner without the problems of gelation of the resin by impurities and off-setting of unreacted silicone.

In a third aspect, the present invention provides a method for modifying a resin having a group reactive with an isocyanate group in a molecule with a polyfunctional isocyanatosiloxane. The polyfunctional isocyanatosiloxane is obtained by effecting addition reaction between a hydrogenosiloxane having at least two SiH groups in a molecule of the general formula (V) and an isocyanate group-containing organic silicon compound having one isocyanate group and one aliphatic unsaturated hydrocarbon group in a molecule of the following general formula (VI).

(V)

Each of $R^{31}$ to $R^{37}$, which may be identical or different, is a substituted or unsubstituted monovalent hydrocarbon group having 1 to 12 carbon atoms; X is independently a hydrogen atom or a substituted or unsubstituted monovalent hydrocarbon group having 1 to 12 carbon atoms, and the sum of a+b is an integer inclusive of 0, with the proviso that X at both ends are hydrogen atoms when b is equal to 0.

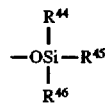
(VI)

Each of $R^{38}$ to $R^{42}$, which may be identical or different, is a substituted or unsubstituted monovalent hydrocarbon group having 1 to 12 carbon atoms or a group represented by $$-OSi-R^{45}$$
with $R^{44}$ above and $R^{46}$ below wherein each of $R^{44}$ to $R^{46}$, which may be identical or different, is a substituted or unsubstituted monovalent hydrocarbon group having 1 to 8 carbon atoms or $R^{38}$ to $R^{42}$, taken together, may form a cyclic structure, with the proviso that only one of $R^{38}$ to $R^{42}$ is an aliphatic unsaturated hydrocarbon group; $R^{43}$ is a divalent hydrocarbon group having 1 to 12 carbon atoms; and letter m is an integer inclusive of 0.

As previously mentioned, the prior art method produces a polyfunctional isocyanatosiloxane by reacting a carbinol siloxane with an excess of a difunctional isocyanate and suffers from the problem of residual difunctional isocyanate. In contrast, the synthesis of an isocyanatosiloxane according to the present invention offers many advantages including that the addition reaction is complete within 10 hours and a polyfunctional isocyanatosiloxane can be synthesized without the problems of residual unreacted silicone and impurities.

Therefore, the method for modifying a resin with the polyfunctional isocyanatosiloxane according to the invention can produce a modified resin having improved surface slippage in an industrially advantageous manner without the problems of gelation of the resin due to excessive crosslinking by impurities and off-setting of unreacted silicone.

DETAILED DESCRIPTION OF THE INVENTION

According to the first aspect, a resin is modified with a single end isocyanatosiloxane. More particularly, a resin having a group reactive with an isocyanate group on a side chain is modified with a siloxane having an isocyanate group at one end. The isocyanatosiloxane is obtained by effecting addition reaction between a single end hydrogenosiloxane of the general formula (I) and an isocyanate group-containing organic silicon compound having one isocyanate group and at least one aliphatic unsaturated hydrocarbon group in a molecule of the general formula (II).

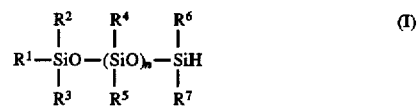
(I)

Each of $R^1$ to $R^7$, which may be identical or different, is a substituted or unsubstituted monovalent hydrocarbon group having 1 to 8 carbon atoms. Letter n is an integer of at least 1.

(II)

Each of $R^8$ to $R^{12}$, which may be identical or different, is a substituted or unsubstituted monovalent hydrocarbon group having 1 to 8 carbon atoms or $R^8$ to $R^{12}$, taken together, may form a cyclic structure, with the proviso that at least one of $R^8$ to $R^{12}$ is an aliphatic unsaturated hydrocarbon group. $R^{13}$ is a divalent hydrocarbon group having 1 to 12 carbon atoms. Letter m is an integer inclusive of 0.

In the single end hydrogenosiloxane of formula (I), exemplary groups represented by $R^1$ to $R^7$ are alkyl groups such as methyl, ethyl, propyl and butyl, alkenyl groups such as vinyl and allyl, aryl groups such as phenyl, aralkyl groups such as benzyl, and halogenated hydrocarbon groups wherein some or all of the hydrogen atoms of the foregoing groups are replaced by halogen atoms. It is preferred that these groups be free of an aliphatic unsaturated bond.

Letter n is an integer of at least 1, preferably 10 to 150. With n of less than 10, surface properties achieved by siloxane modification are sometimes insufficient. With n of more than 150, graft reaction of siloxane to a resin would be retarded or restrained.

In the isocyanatosilicone compound of formula (II), exemplary groups represented by $R^8$ to $R^{12}$ are as mentioned above for $R^1$ to $R^7$. At least one of $R^8$ to $R^{12}$ is an aliphatic unsaturated hydrocarbon group such as alkenyl. $R^{13}$ is a divalent hydrocarbon group having 1 to 12 carbon atoms, preferably 1 to 6 carbon atoms, for example, alkylene groups, arylene groups and substituted ones of these groups wherein some or all of the hydrogen atoms are replaced by halogen atoms. Letter m is an integer inclusive of 0, preferably 0 to 3.

Several illustrative, non-limiting, examples of the isocyanatosilicone compound are given below. Note that Me is a methyl group throughout the disclosure.

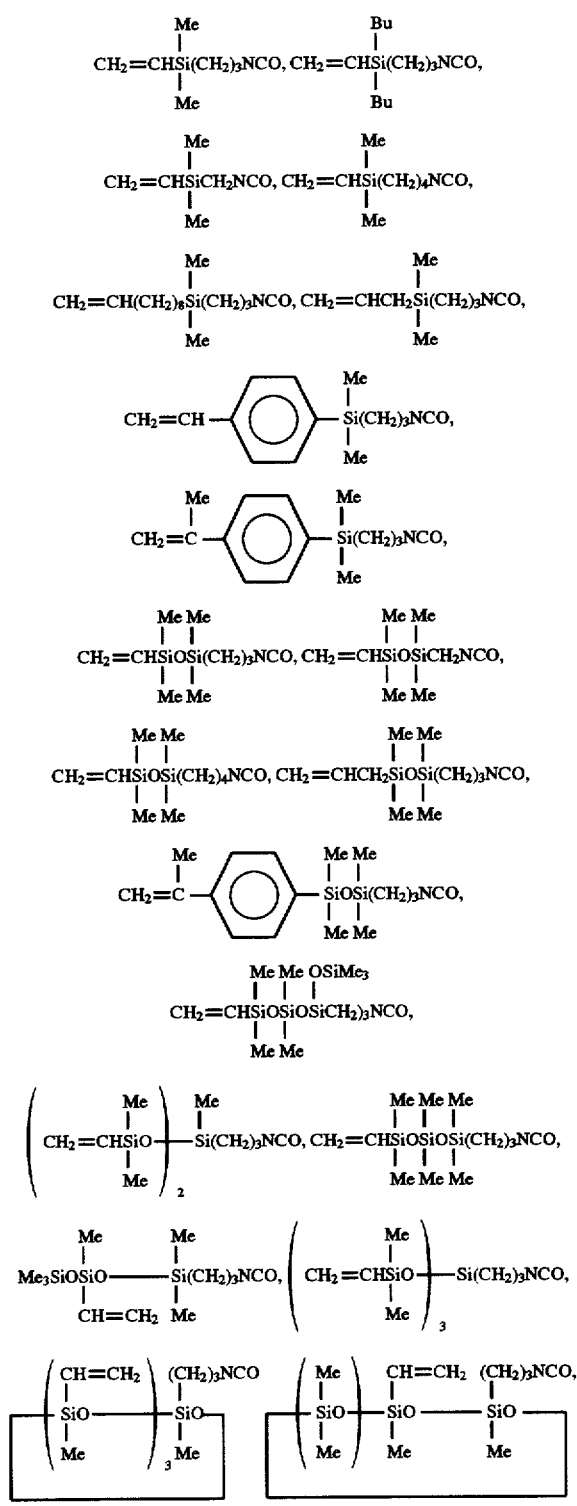

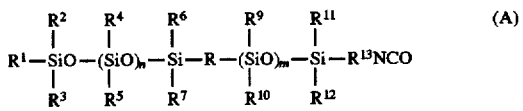

Addition reaction between the single end hydrogenosiloxane of formula (I) and the isocyanatosilicone compound of formula (II) can be carried out in a well-known manner using a platinum catalyst.

Although the addition reaction proceeds without a solvent, solvents such as ester, ketone, ether, aliphatic hydrocarbon and aromatic hydrocarbon solvents may be used if desired. The amount of solvent used is preferably about ½ to 2 times the amount of the single end hydrogenosiloxane.

The platinum catalyst used herein may be any of well-known catalysts used in conventional hydrosilylation reaction. Preferred catalysts are chloroplatinic acid and its derivatives, for example, a complex of chloroplatinic acid with vinyl siloxane wherein chlorine of the acid is neutralized. The platinum catalyst is used in a catalytic amount, preferably 0.1 to 1,000 ppm.

During the reaction, the temperature is preferably 0° C. to 200° C., especially 50° C. to 120° C. A reaction time within 10 hours is usually enough.

In this case, the single end isocyanatosiloxane of the following formula (A):

$$\begin{array}{ccccc} R^2 & R^4 & R^6 & R^9 & R^{11} \\ | & | & | & | & | \\ R^1-SiO-(SiO)_n-Si-R-(SiO)_m-Si-R^{13}NCO \\ | & | & | & | & | \\ R^3 & R^5 & R^7 & R^{10} & R^{12} \end{array} \quad (A)$$

can be obtained by reacting the compound of formula (I) with the compound of formula (II) in which $R^8$ is an aliphatic unsaturated hydrocarbon group, typically an alkenyl group. In the above formula (A), $R^1$ to $R^7$, $R^9$ to $R^{13}$, n and m are defined above although $R^9$ to $R^{12}$ do not preferably have an aliphatic unsaturated bond, and R is a divalent hydrocarbon group having no aliphatic unsaturated bond which is obtained by adding a hydrogen atom of SiH group of the compound of formula (I) to the aliphatic unsaturated bond of $R^8$ of the compound of formula (II). For example, R is —$CH_2CH_2$— when $R^8$ is a vinyl group ($CH_2$=CH—).

According to the second aspect, a resin is modified with a single end isocyanatosiloxane. More particularly, a resin having a group reactive with an isocyanate group on a side chain is modified with a siloxane having an isocyanate group at one end. The isocyanatosiloxane is a single end isocyanatosiloxane of the general formula (III) which is obtained by introducing an isocyanate group into a single end primary aminosiloxane of the general formula (IV).

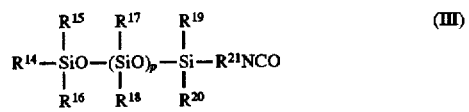

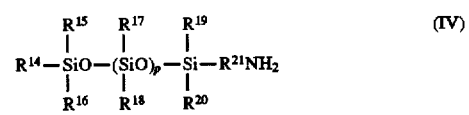

Each of $R^{14}$ to $R^{20}$, which may be identical or different, is a substituted or unsubstituted monovalent hydrocarbon group having 1 to 8 carbon atoms. $R^{21}$ is a divalent hydrocarbon group having 1 to 12 carbon atoms. Letter p is an integer of at least 1.

In formulae (III) and (IV), exemplary groups represented by $R^{14}$ to $R^{20}$ are as mentioned above for $R^1$ to $R^7$ in formula (I), and exemplary groups represented by $R^{21}$ are as mentioned above for $R^{13}$ in formula (II). Letter p is an integer of at least 1, preferably 10 to 150. With p of less than 10, surface properties achieved by siloxane modification are sometimes insufficient. With p of more than 150, graft reaction of siloxane to a resin would be retarded or restrained.

The single end primary aminosiloxane of formula (IV) can be synthesized by well-known techniques, for example, by hydrogenating a corresponding nitrile siloxane to derive an aminosiloxane or by reacting a single end silanol siloxane with an aminating reagent as exemplified below.

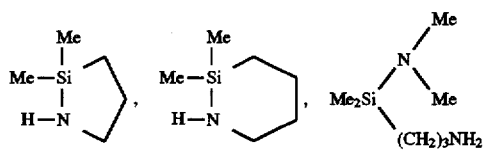

Also, the single end primary aminosiloxane of formula (IV) can be synthesized by adding a ketimine compound of the following formula (VII) to a corresponding single end hydrogenosiloxane for removal of ketone or by adding a silyl derivative of the following formula (VIII) for removal of trimethylsilyl.

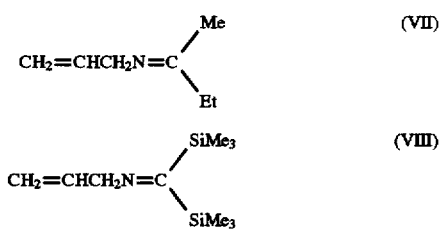

An isocyanate group can be introduced into the single end aminosiloxane of formula (IV) by reacting phosgene or chloroformate with the aminosiloxane in the presence of a basic substance, followed by pyrolysis of the reaction product.

Isocyanate introduction by phosgene can be carried out by the method described in JP-A 228161/1994. When aminosiloxane is reacted with phosgene by this method, much hydrochloric acid generates as seen from the following reaction scheme. Since siloxane bonds are cleaved by hydrochloric acid, the hydrochloric acid must be neutralized with a basic substance such as tertiary amines for preventing siloxane bond cleavage reaction.

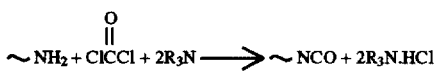

In this reaction, 2 moles of hydrochloric acid results from reaction of 1 mole of amino group with 1 mole of phosgene. It is then desired that the basic substance is also used in an excessive amount of at least 2 moles.

One exemplary reaction procedure involves blowing phosgene into an organic solvent to dissolve phosgene therein, adding dropwise a mixture of an aminosiloxane and a basic substance and optionally an organic solvent to the phosgene solution, and aging the reaction solution. The reaction temperature is desirably −50° C. to 150° C., more desirably −10° C. to 100° C. An aging time within 3 hours is sufficient at reaction temperatures of 50° C. or higher. At the end of aging, the hydrochloric acid salt of the basic substance is removed by filtration or water washing and the solvent is distilled off in vacuum, obtaining a single end isocyanatosiloxane of formula (III).

Isocyanate introduction into a single end aminosiloxane by a chloroformate can be carried out by the method described in JP-A 116390/1994. More particularly, a chloroformate is reacted with a single end primary aminosiloxane in the presence of a basic substance to form a single end carbamatesiloxane, which is subject to pyrolysis or dealcoholysis into an isocyanatosiloxane.

Examples of the chloroformate used herein include alkyl esters such as methyl chloroformate and ethyl chloroformate, and aryl esters such as phenyl chloroformate. Phenyl chloroformate is most preferred because of its low pyrolysis temperature. The basic substance used herein may be the same as used in the phosgene process.

The proportion of the single end primary aminosiloxane to chloroformate to basic substance used is preferably 1/1/1 in molar ratio. For driving the reaction to completion, it is preferred to use 1.0 to 1.1 mole of the chloroformate and 1.1 to 1.2 mole of the basic substance per mole of the single end primary aminosiloxane.

One exemplary reaction procedure involves adding dropwise a chloroformate to a mixture of an aminosiloxane and a basic substance and aging the reaction solution. At the end of aging, the hydrochloric acid salt of the basic substance is removed by filtration or water washing and the solvent is distilled off in vacuum, obtaining a carbamatesiloxane. It is then reacted with phenyl chloroformate and pyrolyzed at a temperature of up to 200° C. under vacuum. Phenol resulting from pyrolysis is distilled off, obtaining a single end isocyanatosiloxane of formula (III).

During the reaction, the temperature is preferably maintained at −50° C. to 150° C., especially 10° C. to 100° C.

In the third aspect, the present invention provides a method for modifying a resin with a polyfunctional isocyanatosiloxane. More particularly, a resin having a group reactive with an isocyanate group in a molecule is modified with a polyfunctional isocyanatosiloxane. The polyfunctional isocyanatosiloxane is obtained by effecting addition reaction between a hydrogenosiloxane having at least two SiH groups in a molecule of the general formula (V) and an isocyanate group-containing organic silicon compound having one isocyanate group and one aliphatic unsaturated hydrocarbon group in a molecule of the following general formula (VI).

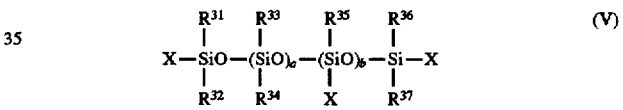

Each of $R^{31}$ to $R^{37}$, which may be identical or different, is a substituted or unsubstituted monovalent hydrocarbon group having 1 to 12 carbon atoms. X is independently a hydrogen atom or a substituted or unsubstituted monovalent hydrocarbon group having 1 to 12 carbon atoms. The sum of a+b is an integer inclusive of 0. X at both ends are hydrogen atoms when b is equal to 0.

Each of $R^{38}$ to $R^{42}$, which may be identical or different, is a substituted or unsubstituted monovalent hydrocarbon group having 1 to 12 carbon atoms or a group represented by

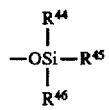

wherein each of $R^{44}$ to $R^{46}$, which may be identical or different, is a substituted or unsubstituted monovalent hydrocarbon group having 1 to 8 carbon atoms or $R^{38}$ to $R^{42}$, taken together, may form a cyclic structure, with the proviso that only one of $R^{38}$ to $R^{42}$ is an aliphatic unsaturated hydrocarbon group. $R^{43}$ is a divalent hydrocarbon group having 1 to 12 carbon atoms. Letter m is an integer inclusive of 0.

In the hydrogenosiloxane of formula (V), exemplary groups represented by $R^{31}$ to $R^{37}$ are alkyl groups such as methyl, ethyl, propyl and butyl, alkenyl groups such as vinyl and allyl, aryl groups such as phenyl, aralkyl groups such as benzyl, and halogenated hydrocarbon groups wherein some or all of the hydrogen atoms of the foregoing groups are replaced by halogen atoms. It is preferred that these groups be free of an aliphatic unsaturated bond. X is independently a hydrogen atom or a substituted or unsubstituted monovalent hydrocarbon group having 1 to 12 carbon atoms, for example, alkyl groups such as methyl, ethyl, propyl and butyl, alkenyl groups such as vinyl and allyl, aryl groups such as phenyl, aralkyl groups such as benzyl, and halogenated hydrocarbon groups wherein some or all of the hydrogen atoms of the foregoing groups are replaced by halogen atoms, such as chloromethyl and chloroethyl.

The sum of a and b is an integer inclusive of 0, preferably 10 to 150 while b is preferably 0 to 50, more preferably 0 to 20. If a+b is less than 10, surface properties achieved by siloxane modification are sometimes insufficient. If a+b is more than 150, graft reaction of siloxane to a resin would be retarded or restrained. The hydrogenosiloxane of formula (V) should have at least two hydrogen atoms each attached to a silicon atom (that is, at least two SiH groups) in a molecule. Then, both terminal X are hydrogen atoms when b=0.

In the isocyanatosilicone compound of formula (VI), each of $R^{38}$ to $R^{42}$, which may be identical or different, is a substituted or unsubstituted monovalent hydrocarbon group having 1 to 12 carbon atoms, preferably 1 to 10 carbon atoms or a group represented by

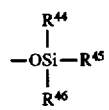

wherein each of $R^{44}$ to $R^{46}$, which may be identical or different, is a substituted or unsubstituted monovalent hydrocarbon group having 1 to 8 carbon atoms. Exemplary groups of $R^{38}$ to $R^{42}$ and $R^{44}$ to $R^{46}$ are the same as mentioned for $R^{31}$ to $R^{37}$. Only one of $R^{38}$ to $R^{42}$ is an aliphatic unsaturated hydrocarbon group such as an alkenyl group. $R^{43}$ is a divalent hydrocarbon group having 1 to 12 carbon atoms, preferably 1 to 6 carbon atoms, for example, alkylene groups, arylene groups and substituted ones wherein some or all of the hydrogen atoms are replaced by halogen atoms. Letter m is an integer inclusive of 0, preferably 0 to 3.

Several illustrative, non-limiting, examples of the isocyanatosilicone of formula (VI) are given below. Me is methyl.

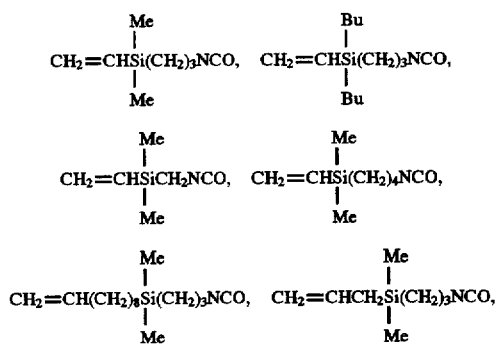

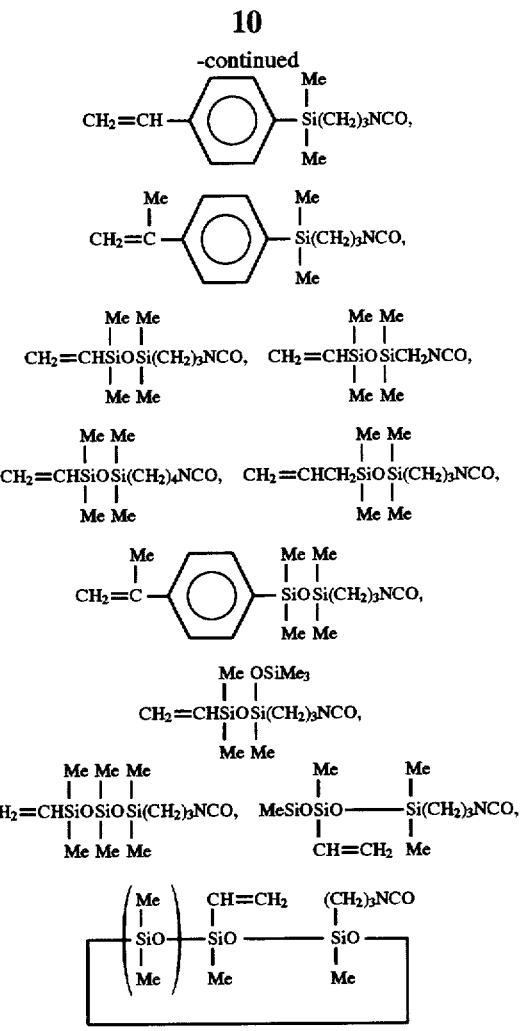

Addition reaction between the hydrogenosiloxane of formula (V) and the isocyanatosilicone compound of formula (VI) can be carried out in a well-known manner using a platinum catalyst.

Although the addition reaction proceeds without a solvent, solvents such as ester, ketone, ether, aliphatic hydrocarbon and aromatic hydrocarbon solvents may be used if desired. The amount of solvent used is preferably about ½ to 2 times the amount of the hydrogenosiloxane.

The platinum catalyst used herein may be any of well-known catalysts used in conventional hydrosilylation reaction. Preferred catalysts are chloroplatinic acid and its derivatives, for example, a complex of chloroplatinic acid with vinyl siloxane wherein chlorine of the acid is neutralized. The platinum catalyst is used in a catalytic amount, preferably 0.1 to 1,000 ppm.

During the reaction, the temperature is preferably 0° C. to 200° C., especially 50° C. to 120° C. A reaction time within 10 hours is usually enough.

According to the invention, resins are modified with the thus obtained isocyanatosiloxanes. The resin to be modified may be any desired one having a group reactive with an isocyanate group on a side chain. Examples include acetal resins, polyester polyol resins, cellulose resins, epoxy polyol resins, polyurethane polyol resins, polyurethane resins, polyester urethane resins, polyether urethane resins, acryl polyol resins, polyvinyl alcohol resins, ethylene/vinyl alcohol resins, vinyl chloride/vinyl acetate/vinyl alcohol copolymers, and polycarbonate polyol resins.

Reaction of resins with isocyanatosiloxanes can be done in the same manner as modification of resins with conventional isocyanates. More particularly, an isocyanatosiloxane and a resin are mixed in such a proportion that the mole number of isocyanate is less than the mole number of active hydrogen such as OH, $NH_2$ and SH groups in the resin. Reaction is preferably performed at room temperature to 150° C., especially 50° to 100° C. for about 1 to 10 hours, especially about 2 to 5 hours. If the isocyanatosiloxane is used in more moles than the active hydrogen, it would sometimes be necessary to remove the unreacted reactant.

Although the reaction can proceed without a solvent, the use of a solvent is preferred from the standpoints of mixing with the resin, reaction efficiency, reaction control, and handling of crosslinked resin. The solvent used herein is preferably an active hydrogen-free solvent such as toluene, xylene, dibutyl ether, ethyl acetate, and hexane. The amount of the solvent used is not critical, but is preferably equal to or up to about 10 times the amount of the resin.

Although the reaction can proceed without a catalyst, the addition of a catalyst is preferred to briefly complete reaction. The catalyst used herein may be selected from those catalysts commonly used in the preparation of polyurethane, for example, organic tin compounds such as dibutyltin dilaurate and dibutyltin dioctoate, and tertiary amines such as triethylamine, N-ethylmorpholine, N,N,N',N'-tetramethyl-1,3-butane diamine, and 1,4-diazabicyclo(5.4.0)-undecene-7. The catalyst is preferably used in an amount of 0.01 to 20% by weight, especially 0.1 to 2% by weight based on the isocyanatosiloxane.

There has been described a method for modifying resins with isocyanatosiloxanes to form modified resins having improved surface slippage in an industrially advantageous manner without problems of resin gelation and off-setting.

EXAMPLE

Examples of the present invention are given below by way of illustration and not by way of limitation.

Synthesis Example 1

A flask equipped with a dropping funnel, condenser, thermometer and stirrer was charged with 37.2 g (0.22 mol) of a compound of the following formula (1). In a nitrogen stream, the flask was heated to 70° C., 16.4 mg ($2\times10^{-4}$ mol) of chloroplatinic acid was added thereto, and 304 g (0.2 mol) of a compound of the following formula (2) was added dropwise at a temperature of 70° to 80° C. After the addition, the reaction solution was aged for 5 hours at 80° to 90° C. On quantitative determination of the residual SiH, the rate of reaction was 97%.

$$CH_2=CHSi(CH_2)_3NCO \quad \text{(1)}$$
(with Me groups)

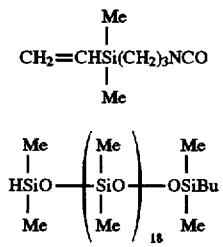

On NMR and elemental analysis, the resulting pale brown clear liquid was identified to be a single end isocyanatosiloxane of the following formula (3).

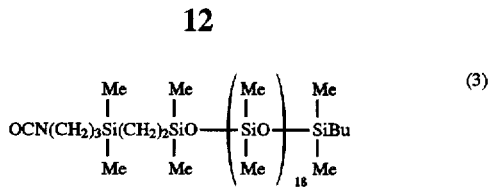

Synthesis Example 2

Reaction was carried out as in Synthesis Example 1 except that 53.5 g (0.22 mol) of a compound of the following formula (4) was used instead of the compound of formula (1). After 5-hour aging, the reaction rate was 97%.

$$CH_2=CHSiOSi(CH_2)_3NCO \quad \text{(4)}$$
(with Me groups)

On NMR and elemental analysis, the resulting pale brown clear liquid was identified to be a single end isocyanatosiloxane of the following formula (5).

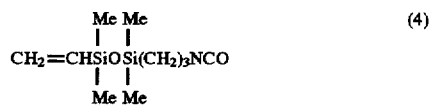

Synthesis Example 3

A flask equipped with a dropping funnel, condenser, thermometer, stirrer and gas inlet tube was purged with nitrogen and charged with 200 g of toluene. About 12 g (about 0.12 mol) of phosgene was bubbled into toluene. Then a mixture of 158 g (0.1 mol) of a compound of the following formula (6) and 25.3 g (0.25 mol) of triethylamine was added dropwise at 0° C. and the reaction solution was aged for one hour at 50° C. The reaction solution was filtered, and toluene was distilled off in vacuum from the filtrate, obtaining a pale yellow clear liquid. On NMR and elemental analysis, the liquid was identified to be a single end isocyanatosiloxane of the following formula (7).

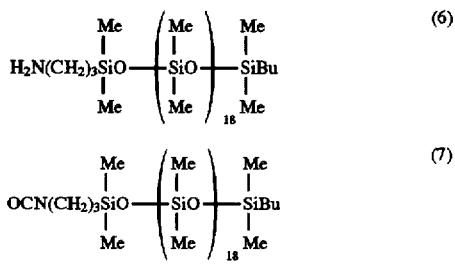

Synthesis Example 4

A flask equipped with a dropping funnel, condenser, thermometer and stirrer was purged with nitrogen and charged with 200 g of toluene, 159 g (0.1 mol) of a compound of the following formula (8) and 14.1 g (0.14 mol) of triethylamine. Then 18.7 g (0.12 mol) of phenyl chloroformate was added dropwise at room temperature and the reaction solution was aged for 3 hours at 60° C. The hydrochloric acid salt of triethylamine was filtered off, and toluene was distilled off in vacuum, obtaining a pale yellow clear liquid. The liquid was subject to pyrolysis at 180° C. under a vacuum of 5 mmHg for 3 hours. On NMR and elemental analysis, the product was identified to be a single end isocyanatosiloxane of the following formula (9).

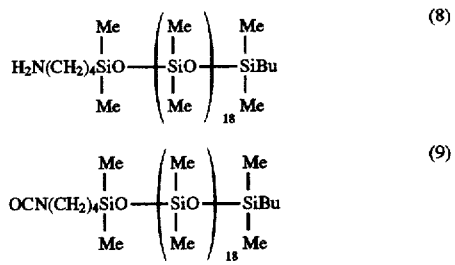

Example 1

A flask equipped with a dropping funnel, condenser, thermometer and stirrer was charged with 100 g of an acetal resin Eslek BX-1 (trade name of a vinyl butyral/vinyl alcohol/vinyl acetate copolymer, manufactured by Sekisui Chemical K.K.), 300 g of ethyl acetate, 300 g of toluene, and 0.1 g of dibutyltin dilaurate and heated at 70° C. for dissolving the resin. To the flask, 10 g of the single end isocyanatosiloxane of formula (3) obtained in Synthesis Example 1 was added dropwise and reaction was carried out at 70° to 80° C. for 6 hours. On quantitative determination of the residual isocyanate, the rate of reaction was 96%.

Example 2

The resin modifying procedure of Example 1 was repeated except that 200 g of Acrydic A-817 (trade name of MMA/styrene/HEMA copolymer, solids 50%, manufactured by Dai Nihon Ink K.K.) was used instead of Eslek BX-1. After 6 hours of reaction, the rate of reaction was 97%.

Example 3

The resin modifying procedure of Example 1 was repeated except that 100 g of a polyester polyol resin Adeka New Ace F15-20 (trade name of adipic acid/ethylene glycol condensate, manufactured by Asahi Denka K.K.) was used instead of Eslek BX-1. After 6 hours of reaction, the rate of reaction was 97%.

Example 4

The resin modifying procedure of Example 1 was repeated except that the compound of formula (5) obtained in Synthesis Example 2 was used as the single end isocyanatosiloxane. After 6 hours of reaction, the rate of reaction was 98%.

Examples 5–7

The resin modifying procedure was carried out as in Examples 1 to 3 except that the compound of formula (7) obtained in Synthesis Example 3 was used as the single end isocyanatosiloxane. After 6 hours of reaction, the rate of reaction was 95%, 97%, and 96%.

Example 8

The resin modifying procedure of Example 4 was repeated except that the compound of formula (9) obtained in Synthesis Example 4 was used as the single end isocyanatosiloxane. After 6 hours of reaction, the rate of reaction was 95%.

Comparative Example 1

The resin modifying procedure of Example 1 was repeated except that 10 g of a siloxane of the following structural formula (10) (0.5 mol excess siloxane relative to HDI) was used as the single end isocyanatosiloxane. During dropwise addition of the isocyantosiloxane, the reaction solution thickened and gelled.

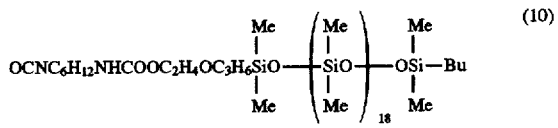

Comparative Examples 2–4

For comparison purposes, the resins used in Examples 1 to 3 were dissolved in ethyl acetate/toluene to form sample solutions without reacting with single end isocyanatosiloxanes.

The samples of Examples and Comparative Examples were evaluated for surface properties by the following test.

Evaluation of Surface Properties

A sample solution was coated on glass and dried to form a coating, which was measured for a contact angle with water. Separately, a sample solution was coated on PET film and dried, another PET film was laid on the coated surface, and the laminate under a load of 20 g/cm$^2$ was allowed to stand at 60° C. for 48 hours. The transferred surface was measured for surface tension using a wetting index standard solution. Off-setting was rated "OK" and "NG" by visual observation.

The results are shown in Table 1.

TABLE 1

| Example | Resin to be modified | Isocyanato-siloxane | Contact angle | Off-setting |
|---|---|---|---|---|
| E1 | Acetal BX-1 | (3) | 114° | OK |
| E2 | Acryl polyol A-817 | (3) | 109° | OK |
| E3 | Polyester polyol F15-20 | (3) | 108° | OK |
| E4 | Acetal BX-1 | (5) | 113° | OK |
| E5 | Acetal BX-1 | (7) | 112° | OK |
| E6 | Acryl polyol A-817 | (7) | 110° | OK |
| E7 | Polyester polyol F15-20 | (7) | 107° | OK |
| E8 | Acetal BX-1 | (9) | 109° | OK |
| CE2 | Acetal BX-1 | — | 76° | NG |
| CE3 | Acryl polyol A-817 | — | 70° | NG |
| CE4 | Polyester polyol F15-20 | — | 73° | NG |

As is evident from Table 1, the resins modified with single end isocyanato-terminated siloxanes according to the present invention do not gel during the modifying step and are free of off-setting. They are excellent siloxane-modified resins.

Synthesis Example 5

A flask equipped with a dropping funnel, condenser, thermometer and stirrer was charged with 53.5 g (0.22 mol) of a compound of the following formula (11). In a nitrogen stream, the flask was heated to 70° C., 16.4 mg (2×10$^{-4}$ mol) of chloroplatinic acid was added thereto, and 309 g (0.1 mol) of a hydrogenosiloxane of the following formula (12) was added dropwise at a temperature of 70° to 80° C. After the addition, the reaction solution was aged for 5 hours at 80° to 90° C. On quantitative determination of the residual SiH, the rate of reaction was 98%.

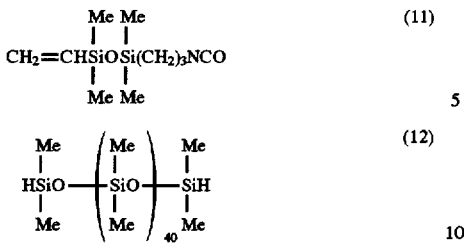

(11)

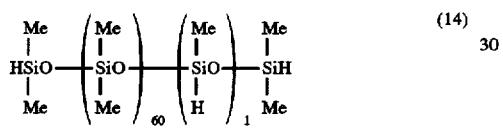

(12)

The excess of the compound of formula (11) was distilled off under vacuum, obtaining a pale brown clear liquid. On NMR and elemental analysis, the liquid was identified to be an isocyanatosiloxane of the following formula (13).

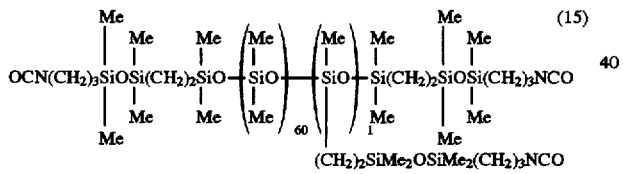

(13)

Synthesis Example 6

Reaction was carried out as in Synthesis Example 5 except that 310 g (0.067 mol) of a compound of the following formula (14) was used instead of the compound of formula (12). The reaction rate was 96%.

$$\text{Me}\underset{|}{\text{Me}}\text{HSiO}-\left(\underset{|}{\overset{|}{\text{SiO}}}\text{Me}\right)_{60}-\left(\underset{|}{\overset{|}{\text{SiO}}}\text{H}\right)_{1}-\underset{|}{\overset{|}{\text{SiH}}}\text{Me}$$

(14)

On NMR and elemental analysis, the resulting pale brown clear liquid was identified to be an isocyanatosiloxane of the following formula (15).

$$\text{OCN(CH}_2\text{)}_3\text{SiOSi(CH}_2\text{)}_2\text{SiO}-(\text{SiO})-(\text{SiO})-\text{Si(CH}_2\text{)}_2\text{SiOSi(CH}_2\text{)}_3\text{NCO}$$
$$(\text{CH}_2\text{)}_2\text{SiMe}_2\text{OSiMe}_2(\text{CH}_2\text{)}_3\text{NCO}$$

(15)

Synthesis Example 7

Reaction was carried out as in Synthesis Example 5 except that 37.2 g (0.22 mol) of an isocyanate of the following formula (16) was used instead of the isocyanate of formula (11) and 320 g (0.067 mol) of a hydrogenosiloxane of the following formula (17) was used instead of the hydrogenosiloxane of formula (12). The reaction rate was 96%.

$$\text{CH}_2=\text{CHSi(CH}_2\text{)}_3\text{NCO}$$
$$|$$
$$\text{Me}$$

(16)

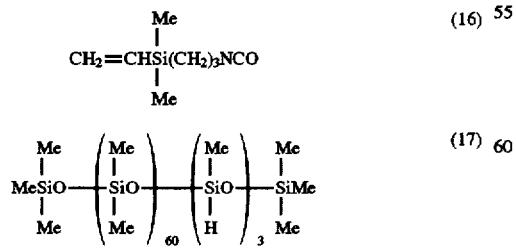

(17)

On NMR and elemental analysis, the resulting pale brown clear liquid was identified to be an isocyanatosiloxane of the following formula (18).

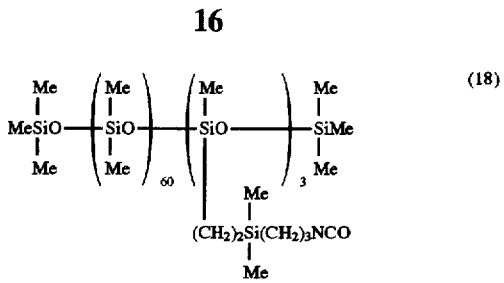

(18)

Comparative Synthesis Example 1

In 500 g of toluene were dissolved 0.1 mol of a compound of the following formula (19) and 0.45 mol of hexamethylene diisocyanate (HDI). Using 1 g of dibutyltin dilaurate as a catalyst, reaction was carried out at 70° to 80° C. for 6 hours. The rate of reaction was 97%.

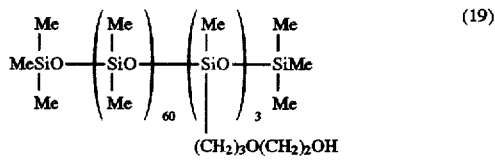

(19)

The toluene was stripped off. The residue could not be dissolved again by adding toluene and ethyl acetate thereto. Thus it was not useful as a modifying agent.

Comparative Synthesis Example 2

Reaction was carried out as in Synthesis Example 5 except that 320 g of a compound of formula (17) and 44.2 g (0.22 mol) of an isocyanate of the following formula (20) were used. After the completion of dropwise addition, the reaction solution was aged at 80° to 90° C. for 30 hours, but the rate of reaction was 25%.

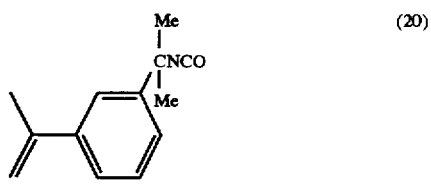

(20)

Example 9

A flask equipped with a dropping funnel, condenser, thermometer and stirrer was charged with 100 g of an acetal resin Eslek BX-1 (trade name of a vinyl butyral/vinyl alcohol/vinyl acetate copolymer, manufactured by Sekisui Chemical K.K.), 300 g of ethyl acetate, 300 g of toluene, and 0.1 g of dibutyltin dilaurate and heated at 70° C. for dissolving the resin. To the flask, 10 g of the isocyanatosiloxane of formula (13) obtained in Synthesis Example 5 was added dropwise and reaction was carried out at 70° to 80° C. for 6 hours. On quantitative determination of the residual isocyanate, the rate of reaction was 95%.

Example 10

The resin modifying procedure of Example 1 was repeated except that 200 g of Acrydic A-817 (trade name of MMA/styrene/HEMA copolymer, solids 50%, manufactured by Dai Nihon Ink K.K.) was used instead of Eslek BX-1. After 6 hours of reaction, the rate of reaction was 98%.

Example 11

The resin modifying procedure of Example 1 was repeated except that 100 g of a polyester polyol resin Adeka New Ace F15-20 (trade name of adipic acid/ethylene glycol condensate, manufactured by Asahi Denka K.K.) was used instead of Eslek BX-1. After 6 hours of reaction, the rate of reaction was 96%.

Examples 12–14

The resin modifying procedure was carried out as in Examples 9 to 11 except that the siloxane of formula (15) obtained in Synthesis Example 6 was used as the isocyanatosiloxane. After 6 hours of reaction, the rate of reaction was 98%, 98%, and 95%.

Example 15

The resin modifying procedure of Example 10 was repeated except that the siloxane of formula (18) obtained in Synthesis Example 7 was used as the isocyanatosiloxane. After 6 hours of reaction, the rate of reaction was 95%.

Comparative Examples 5–7

For comparison purposes, the resins used in Examples 9 to 11 were dissolved in ethyl acetate/toluene to form sample solutions without reacting with isocyanatosiloxanes.

The same test as described above was conducted. The results are shown in Table 2.

TABLE 2

| Example | Resin to be modified | Isocyanato-siloxane | Contact angle | Off-setting |
|---|---|---|---|---|
| E9 | Acetal BX-1 | (13) | 113° | OK |
| E10 | Acryl polyol A-817 | (13) | 106° | OK |
| E11 | Polyester polyol F15-20 | (13) | 110° | OK |
| E12 | Acetal BX-1 | (15) | 111° | OK |
| E13 | Acryl polyol A-817 | (15) | 109° | OK |
| E14 | Polyester polyol F15-20 | (15) | 109° | OK |
| E15 | Acryl polyol A-817 | (18) | 105° | OK |
| CE5 | Acetal BX-1 | — | 76° | NG |
| CE6 | Acryl polyol A-817 | — | 70° | NG |
| CE7 | Polyester polyol F15-20 | — | 73° | NG |

As is evident from Table 2, the resins modified with isocyanatosiloxanes according to the present invention do not gel during the modifying step and are free of off-setting. They are excellent siloxane-modified resins.

Japanese Patent Application Nos. 332149/1994 and 202815/1995 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for modifying a resin having a group reactive with an isocyanate group on a side chain which comprises reacting the resin with a single end isocyanatosiloxane which isocyanatosiloxane is obtained by effecting addition reaction between a single end hydrogenosiloxane of the following formula (I):

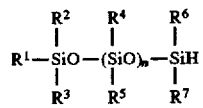

wherein $R^1$ to $R^7$ are independently selected from halogen-substituted or unsubstituted monovalent hydrocarbon groups having 1 to 8 carbon atoms and letter n is an integer of at least 1 and an isocyanate group-containing organic silicon compound having one isocyanate group and at least one aliphatic unsaturated hydrocarbon group in a molecule of the following formula (II):

wherein $R^8$ to $R^{12}$ are independently selected from halogen-substituted or unsubstituted monovalent hydrocarbon groups having 1 to 8 carbon atoms or $R^8$ to $R^{12}$, taken together, may form a cyclic structure, with the proviso that at least one of $R^8$ to $R^{12}$ is an aliphatic unsaturated hydrocarbon group, $R^{13}$ is a divalent hydrocarbon group having 1 to 12 carbon atoms, and letter m is an integer inclusive of 0.

2. The method of claim 1, wherein the addition reaction is complete within 10 hours.

3. The method of claim 1, wherein each of $R^1$ to $R^{12}$ are independently an alkyl, alkenyl, phenyl or benzyl group optionally substituted by halogen, at least one of $R^8$ to $R^{12}$ being alkenyl, $R^{13}$ is an alkylene or arylene group optionally substituted by halogen, n is an integer of 10–150 and m is an integer inclusive of 0 from 0 to 3.

4. The method of claim 1, wherein the resin is an acetal, polyester polyol, cellulose, epoxy polyol, polyurethane polyol, polyurethane, polyester urethane, polyether urethane, acryl polyol, polyvinyl alcohol, ethylene/vinyl alcohol, vinyl chloride/vinyl acetate/vinyl alcohol copolymer or polycarbonate polyol resin.

5. The method of claim 1, wherein the isocyanatosiloxane and resin are reacted in a proportion such that the mole number of the isocyanatosiloxane is less than the mole number of the groups reactive with isocyanate on the resin.

6. The method of claim 1, wherein the reaction of the isocyanatosiloxane and resin is conducted at a temperature of from room temperature to 150° C. for about 1 to 10 hours.

7. The method of claim 1, wherein the reaction of the isocyanatosiloxane and resin is conducted in the presence of an active hydrogen-free solvent and an organic tin compound or tertiary amine catalyst.

8. A method for modifying a resin having a group reactive with an isocyanate group on a side chain which comprises reacting the resin with a single end isocyanatosiloxane of the following formula (III):

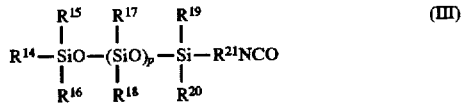

wherein $R^{14}$ to $R^{20}$ are independently selected from halogen-substituted or unsubstituted monovalent hydrocarbon groups having 1 to 8 carbon atoms, $R^{21}$ is a divalent hydrocarbon group having 1 to 12 carbon atoms, and letter p is an integer of 10–150, the isocyanatosiloxane of formula (III) being obtained by introducing an isocyanate group into a single end primary aminosiloxane of the following formula (IV):

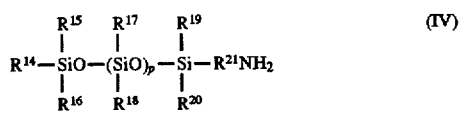

wherein $R^{14}$ to $R^{21}$ and p are as defined above.

9. The method of claim 8, wherein each of $R^{14}$ to $R^{20}$ are independently an alkyl, alkenyl, phenyl or benzyl group optionally substituted by halogen, and $R^{21}$ is an alkylene or arylene group optionally substituted by halogen.

10. The method of claim 8, wherein introducing the isocyanate group into the single end primary aminosiloxane is conducted by reacting the aminosiloxane with phosgene or chloroformate in the presence of a basic substance and pyrolyzing the resulting reaction product.

11. The method of claim 8, wherein the resin is an acetal, polyester polyol, cellulose, epoxy polyol, polyurethane polyol, polyurethane, polyester urethane, polyether urethane, acryl polyol, polyvinyl alcohol, ethylene/vinyl alcohol, vinyl chloride/vinyl acetate/vinyl alcohol copolymer or polycarbonate polyol resin.

12. The method of claim 8, wherein the isocyanatosiloxane and resin are reacted in a proportion such that the mole number of the isocyanatosiloxane is less than the mole number of the groups reactive with isocyanate on the resin.

13. The method of claim 8, wherein the reaction of the isocyanatosiloxane and resin is conducted at a temperature of from room temperature to 150° C. for about 1 to 10 hours.

14. The method of claim 8, wherein the reaction of the isocyanatosiloxane and resin is conducted in the presence of an active hydrogen-free solvent and an organic tin compound or tertiary amine catalyst.

15. A method for modifying a resin having a group reactive with an isocyanate group in a molecule which comprises reacting the resin with a polyfunctional isocyanatosiloxane which isocyanatosiloxane is obtained by effecting addition reaction between a hydrogenosiloxane having at least two SiH groups in a molecule of the following formula (V):

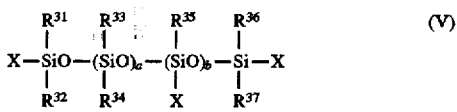

wherein $R^{31}$ to $R^{37}$ are independently selected from halogen-substituted or unsubstituted monovalent hydrocarbon groups having 1 to 12 carbon atoms, X is independently a hydrogen atom or a halogen-substituted or unsubstituted monovalent hydrocarbon group having 1 to 12 carbon atoms, and the sum of a+b is an integer inclusive of 0, with the proviso that X at both ends are hydrogen atoms when b is equal to 0, and an isocyanate group-containing organic silicon compound having one isocyanate group and one aliphatic unsaturated hydrocarbon group in a molecule of the following formula (VI):

wherein $R^{38}$ to $R^{42}$ are independently selected from a halogen-substituted or unsubstituted monovalent hydrocarbon group having 1 to 12 carbon atoms and a group represented by

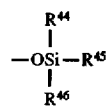

wherein $R^{44}$ to $R^{46}$ are independently selected from a halogen-substituted or unsubstituted monovalent hydrocarbon group having 1 to 8 carbon atoms or $R^{38}$ to $R^{42}$, taken together, may form a cyclic structure, with the proviso that only one of $R^{38}$ to $R^{42}$ is an aliphatic unsaturated hydrocarbon group, $R^{43}$ is a divalent hydrocarbon group having 1 to 12 carbon atoms optionally substituted by halogen atoms, and letter m is an integer inclusive of 0.

16. The method of claim 15, wherein the addition reaction is complete within 10 hours.

17. The method of claim 15, wherein each of $R^{31}$ to $R^{42}$ and $R^{44}$ to $R^{46}$ are independently an alkyl, alkenyl, phenyl or benzyl group optionally substituted by halogen, X is hydrogen or an alkyl, alkenyl, phenyl or benzyl group optionally substituted by halogen, $R^{43}$ is an alkylene or arylene group optionally substituted by halogen, the sum of a+b is an integer of 10–150, b is 0–50 and m is 0–3.

18. The method of claim 15, wherein the resin is an acetal, polyester polyol, cellulose, epoxy polyol, polyurethane polyol, polyurethane, polyester urethane, polyether urethane, acryl polyol, polyvinyl alcohol, ethylene/vinyl alcohol, vinyl chloride/vinyl acetate/vinyl alcohol copolymer or polycarbonate polyol resin.

19. The method of claim 15, wherein the isocyantosiloxane and resin are reacted in a proportion such that the mole number of isocyanato groups is less than the mole number of the groups reactive with isocyanate on the resin.

20. The method of claim 15, wherein the reaction of the isocyanatosiloxane and resin is conducted at a temperature of from room temperature to 150° C. for about 1 to 10 hours.

21. The method of claim 15, wherein the reaction of the isocyanatosiloxane and resin is conducted in the presence of an active hydrogen-free solvent and an organic tin compound or tertiary amine catalyst.

* * * * *